United States Patent
Kang et al.

(10) Patent No.: US 10,857,524 B2
(45) Date of Patent: Dec. 8, 2020

(54) HIGHLY CONDUCTIVE CARBON NANOTUBES AND METHOD FOR MANUFACTURING SAME

(71) Applicant: LG CHEM, LTD., Seoul (KR)

(72) Inventors: Kyung Yeon Kang, Daejeon (KR); Yelin Kim, Daejeon (KR); Jihee Woo, Daejeon (KR); Jung Keun Yoo, Daejeon (KR); Dong Hyun Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/080,898

(22) PCT Filed: Mar. 21, 2017

(86) PCT No.: PCT/KR2017/003012
§ 371 (c)(1),
(2) Date: Aug. 29, 2018

(87) PCT Pub. No.: WO2017/171291
PCT Pub. Date: Oct. 5, 2017

(65) Prior Publication Data
US 2019/0060878 A1 Feb. 28, 2019

(30) Foreign Application Priority Data
Mar. 30, 2016 (KR) .......................... 10-2016-0038350

(51) Int. Cl.
*C01B 32/158* (2017.01)
*B01J 23/84* (2006.01)
(Continued)

(52) U.S. Cl.
CPC ............. *B01J 23/84* (2013.01); *B01J 23/847* (2013.01); *C01B 32/158* (2017.08);
(Continued)

(58) Field of Classification Search
CPC ... C01B 32/162; C01B 32/158; C01B 32/156; H01M 4/62; C08K 3/042
See application file for complete search history.

(56) References Cited

U.S. PATENT DOCUMENTS 7,608,362 B2 * 10/2009 Choi .................. B82Y 30/00
252/182.1
9,190,664 B2 * 11/2015 Cha .................. H01M 4/505
(Continued)

FOREIGN PATENT DOCUMENTS

JP 2007-015914 A 1/2007
JP 2007-237182 A 9/2007
(Continued)

OTHER PUBLICATIONS

Khan', H. et al., "Influence of Surface Oxidation on the Morphological and Crystallographic Structure of Multi-walled Carbon Nanotubes via Different Oxidants", Journal of Nanostructure in Chemistry, vol. 3, article 73, internal pp. 1-8, 2013 (Electronic publishing Aug. 20, 2013).

*Primary Examiner* — Ula C Ruddock
*Assistant Examiner* — Thomas H. Parsons
(74) *Attorney, Agent, or Firm* — Dentons US LLP

(57) ABSTRACT

The carbon nanotubes according to the present invention can provide higher conductivity by allowing the BET and crystal size to satisfy the conditions expressed by formula 1 below, and consequently, can improve the conductivity of a carbon composite material containing the carbon nanotubes.

$$L_c \times [\text{Specific surface area of CNT (cm}^2/\text{g)}]^{1/2} > 80 \quad \text{[Formula 1]}$$

wherein, $L_c$ is crystal size measured by X-ray diffraction.

15 Claims, 5 Drawing Sheets

(51) Int. Cl.
- *C08J 5/00* (2006.01)
- *C08K 3/04* (2006.01)
- *C08K 7/22* (2006.01)
- *H01M 4/62* (2006.01)
- *H01M 10/0525* (2010.01)
- *C01B 32/162* (2017.01)
- *C01B 32/17* (2017.01)
- *D01F 9/127* (2006.01)
- *B01J 23/847* (2006.01)

(52) U.S. Cl.
CPC ............ *C01B 32/162* (2017.08); *C01B 32/17* (2017.08); *C08J 5/00* (2013.01); *C08K 3/04* (2013.01); *C08K 7/22* (2013.01); *D01F 9/127* (2013.01); *H01M 4/62* (2013.01); *H01M 10/0525* (2013.01); *C01B 2202/22* (2013.01); *C01B 2202/32* (2013.01)

(56) References Cited

U.S. PATENT DOCUMENTS

| | | |
|---|---|---|
| 2006/0002842 A1 | 1/2006 | Yoon |
| 2006/0008408 A1 | 1/2006 | Ho et al. |
| 2006/0078730 A1* | 4/2006 | Tsukada ................ B82Y 30/00 |
| | | 428/364 |
| 2009/0008611 A1 | 1/2009 | Oriji et al. |
| 2009/0075077 A1 | 3/2009 | Yoon |

FOREIGN PATENT DOCUMENTS

| | | |
|---|---|---|
| JP | 2009-117374 A | 5/2009 |
| KR | 10-2002-0092996 A | 12/2002 |
| KR | 10-2015-0037661 A | 4/2015 |
| WO | WO2013013070 * | 3/2013 |

\* cited by examiner

[Fig. 1]
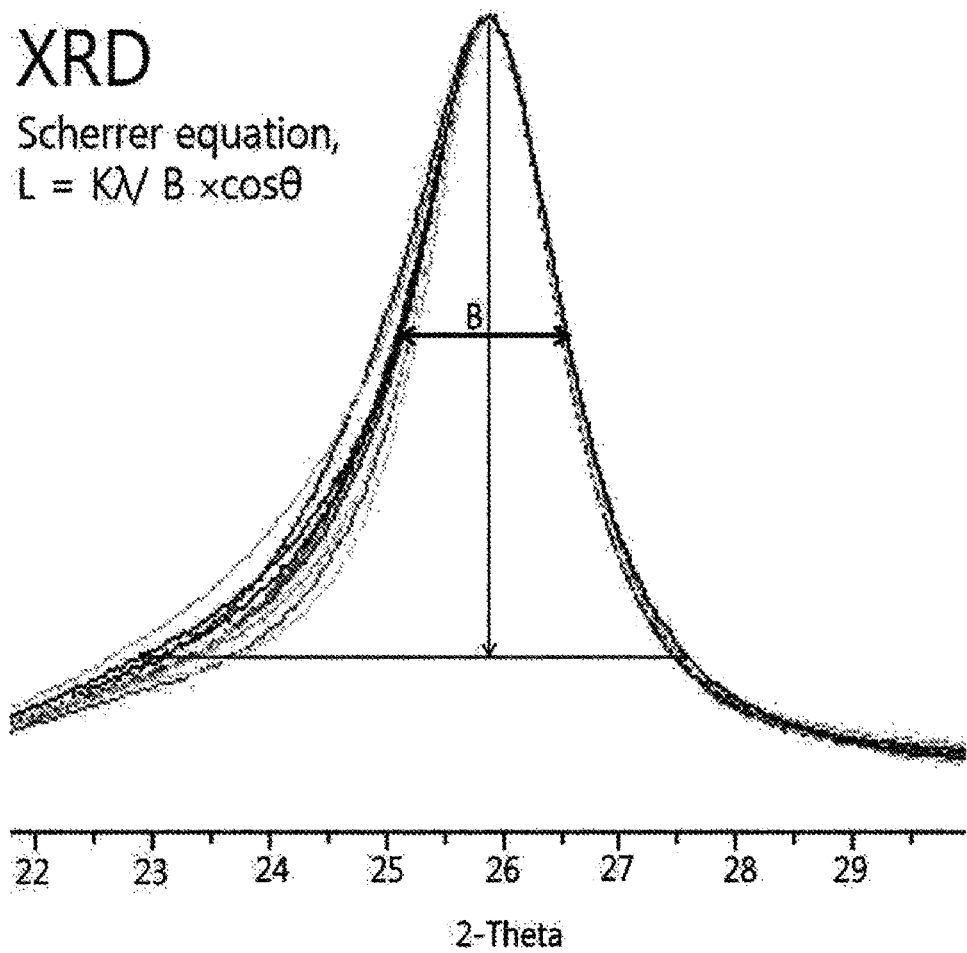

[Fig. 2]
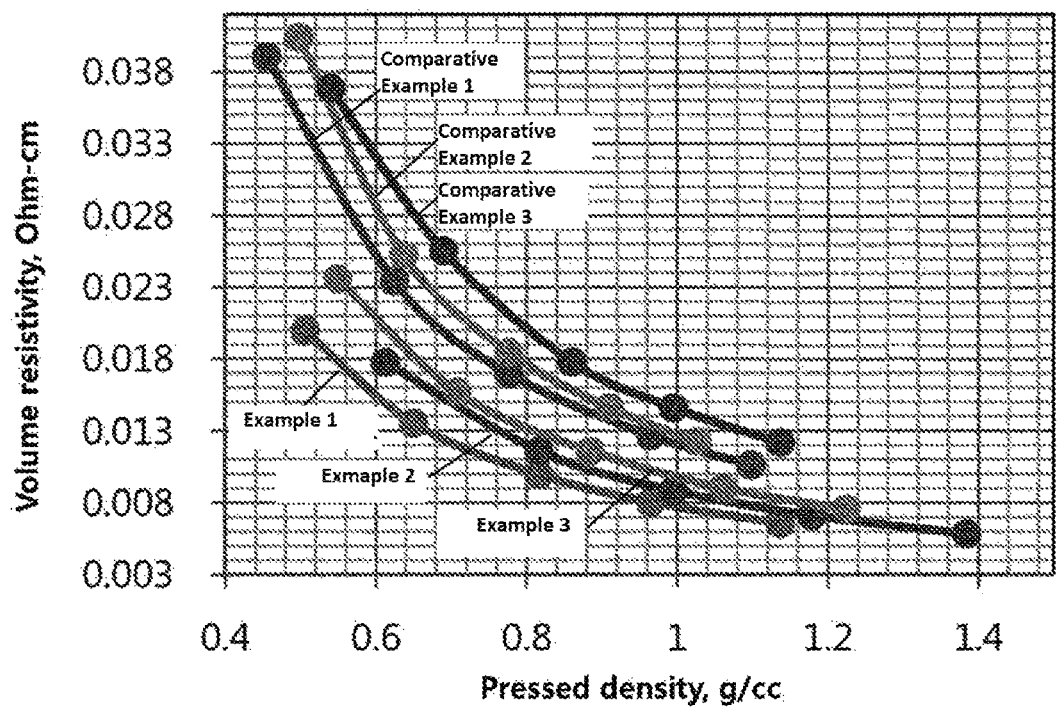

[Fig. 3]
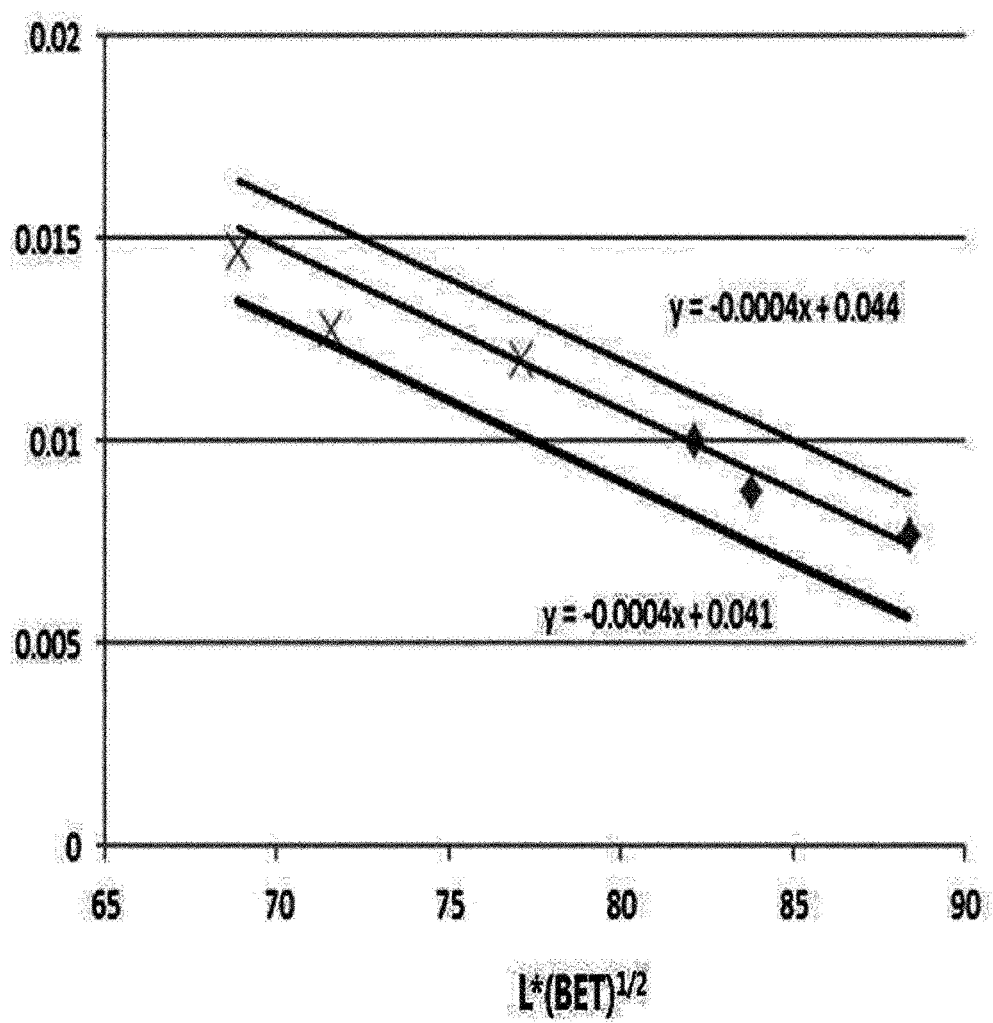

[Fig. 4]
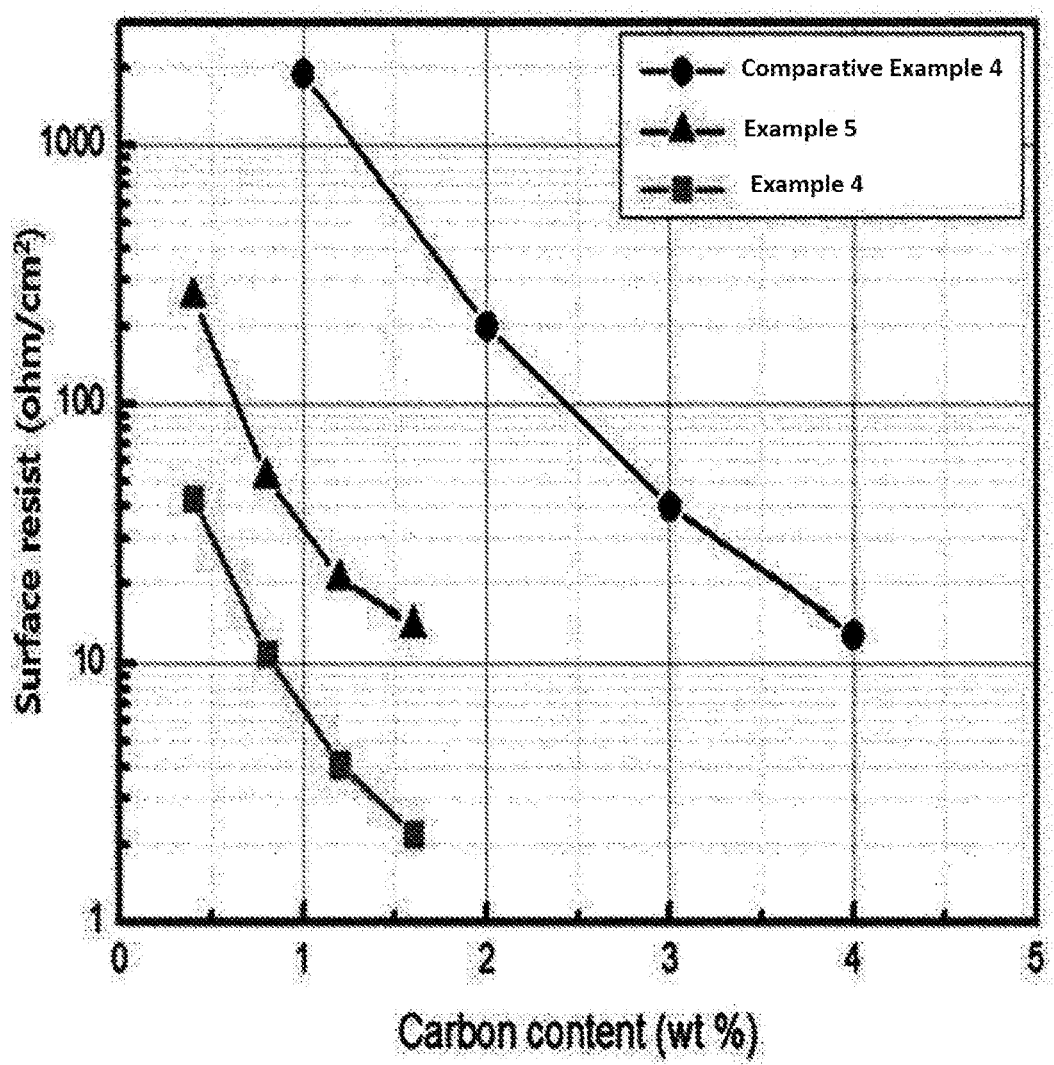

[Fig. 5]
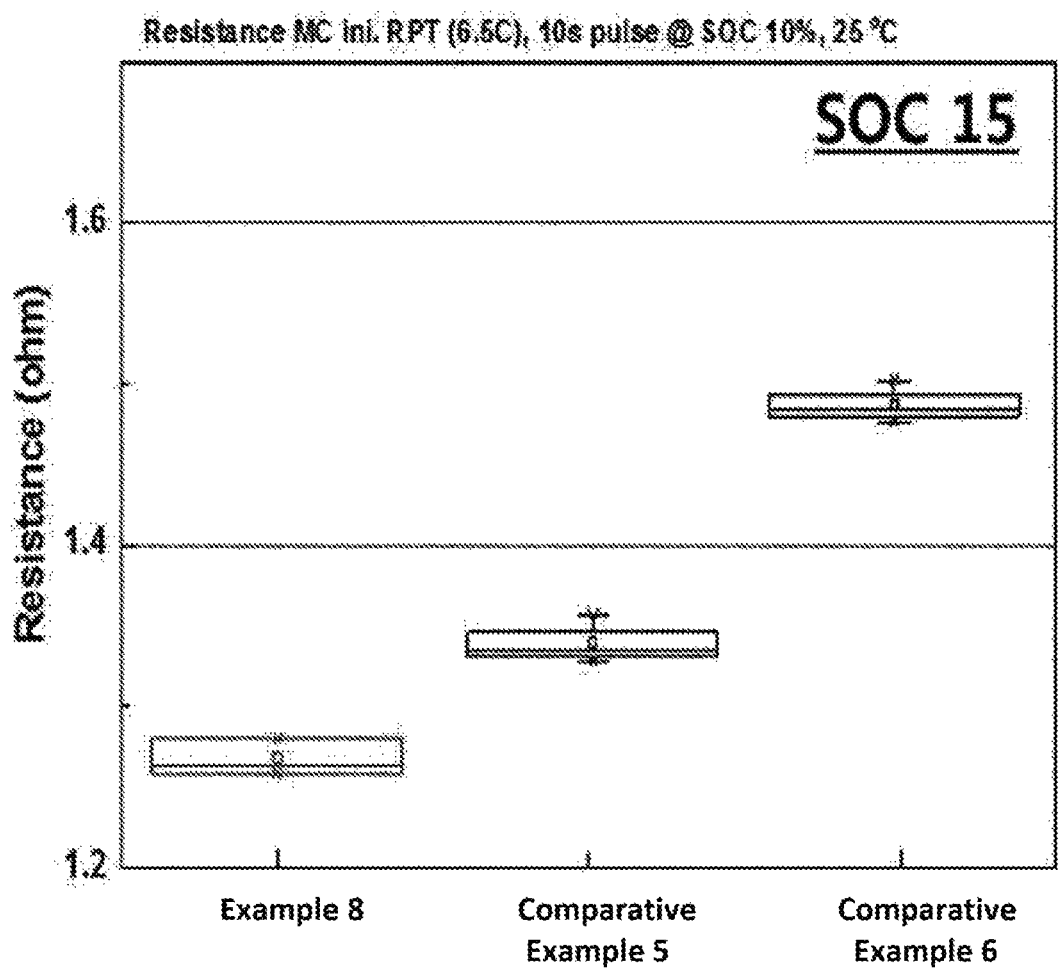

HIGHLY CONDUCTIVE CARBON NANOTUBES AND METHOD FOR MANUFACTURING SAME

BACKGROUND OF THE INVENTION

1. Field of the Invention

This application is a National Stage Entry of International Application No. PCT/KR2017/003012 filed on Mar. 21, 2017, and claims the benefit of Korean Application No. 10-2016-0038350, filed on Mar. 30, 2016, all of which are hereby incorporated by reference in their entirety for all purposes as if fully set forth herein.

The present invention provides high conductive carbon nanotubes, and more particularly, to high conductive carbon nanotubes having specific surface area and crystal size satisfying specific criteria.

2. Description of the Related Art

Generally, a carbon nanotube (hereinafter, referred to as CNT) has a cylindrical carbon tube having a diameter of about 3 to 150 nm, specifically about 3 to 100 nm, and a length several times the diameter, for example, 100 times or more. The CNT is made up of layers of ordered carbon atoms and has different types of cores. Such a CNT is also referred to as a carbon fibril or a hollow carbon fiber, for example.

The CNT can be generally manufactured by an arc discharge, a laser evaporation, a chemical vapor deposition, or the like. Among them, the arc discharge and the laser evaporation are difficult to apply to mass production and have a problem that economical efficiency is lowered due to an excessive cost of arc generation or the cost of purchasing a laser equipment.

In chemical vapor deposition, carbon nanostructures are produced by dispersing and reacting metal catalyst particles and hydrocarbon-based source gas in a fluidized bed reactor at a high temperature. That is, metal catalysts react with the source gas to grow carbon nanostructures, while floating in a fluidized bed reactor by the source gas.

Carbon nanotubes exhibit non-conducting, conducting, or semi-conductive properties depending on their specific chirality. The carbon atoms are connected by a strong covalent bond. Therefore, the tensile strength of the carbon nanotube is about 100 times greater than that of steel. The carbon nanotubes are excellent in flexibility and elasticity and have chemically stable characteristics. Due to such size and specific physical properties, the carbon nanotubes are industrially important in the production of composites and have high utility in the fields of electronic materials, energy materials and other fields. For example, the carbon nanotubes may be applied to an electrode of an electrochemical storage device such as a secondary cell, a fuel cell or a super capacitor, an electromagnetic wave shield, a field emission display, or a gas sensor.

Particularly, research and development of a composite using the carbon nanotubes are actively proceeding. In particular, a composite with engineering plastics enables to impart electrical conductivity to electric and electronic products, so that it can be used as high-added value material such as an electromagnetic shielding material and an antistatic material. However, in case that it is desired to obtain a desired electrical conductivity with a small amount of the carbon nanotubes, the electric conductivity depends on the processing conditions and the resin used, in particular on the electrical properties of the carbon nanotubes themselves. Generally, the carbon nanotubes have problems that their inherent electrical properties are deteriorated and the desired electrical properties are not exhibited after application to the composite. Therefore, in the stage of developing the composite, a main factor for improving the conductivity of the carbon nanotube itself is required. Generally, BET is used as a factor of conductivity.

SUMMARY OF THE INVENTION

An object of the present invention is to provide high conductive carbon nanotubes having improved conductivity by satisfying specific conditions and a method for manufacturing the same.

Another object of the present invention is to provide a polymer composite and a lithium secondary battery comprising the high conductive carbon nanotubes.

In order to solve the problem of the present invention, the present invention provides high conductive carbon nanotubes satisfying the condition of the following Formula 1:

$$L_c \times [\text{Specific surface area of CNT } (m^2/g)]^{1/2} > 80 \quad \text{[Formula 1]}$$

wherein, $L_c$ is the size of crystals measured by X-ray diffraction.

In order to solve another problem of the present invention, there is provided a method for manufacturing the carbon nanotubes using the above Formula 1 as an evaluation standard.

Also, the present invention provides a polymer composite or a lithium secondary battery comprising the high conductive carbon nanotubes.

Effect of the Invention

The carbon nanotubes according to the present invention have a BET value and a crystal size satisfying a specific relationship. These properties affect powder resistivity, allowing carbon nanotubes having higher conductivity characteristics. Further, in the manufacturing process of the carbon nanotubes, by controlling the physical properties so as to satisfy the relationship between the factors based on the condition of the Formula 1 which is derived by combining the BET and the crystal size, it is possible to produce the carbon nanotubes with improved conductivity more efficiently. The carbon nanotubes can be effectively applied as a conductive material of a carbon composite material requiring high conductivity.

BRIEF DESCRIPTION OF THE DRAWINGS

FIG. 1 illustrates a method of determining the crystal size of the carbon nanotubes.

FIG. 2 shows powder resistivity according to pressed density of carbon nanotubes according to Examples and Comparative Examples.

FIG. 3 is a graph showing the correlation between the value derived by Formula 1 and the powder resistivity.

FIG. 4 is a graph showing changes in surface resistivity according to CNT content in a polymer composite comprising CNTs of Examples and Comparative Examples.

FIG. 5 shows the internal resistivity of a lithium secondary battery comprising CNTs of Examples and Comparative Examples as the conductive material of the cathode.

DETAILED DESCRIPTION OF THE INVENTION

The terms and words used in the present specification and claims should not be construed as limited to ordinary or dictionary meanings, and should be construed as meaning and concept consistent with the technical idea of the present invention based on the principle that the inventor can appropriately define the concept of the term in order to explain his invention in the best way.

Hereinafter, the present invention will be described in detail.

The present invention provides high conductive carbon nanotubes satisfying the condition of the following Formula 1:

$$L_c \times [\text{Specific surface area of CNT } (m^2/g)]^{1/2} > 80 \quad \text{[Formula 1]}$$

wherein, $L_c$ is crystal size measured by X-ray diffraction method.

Further, the present invention provides a method for evaluating the conductivity of carbon nanotubes using the condition of the above Formula 1 as an evaluation standard.

The BET specific surface area of the carbon nanotubes according to the present invention may be 200 $m^2/g$ to 500 $m^2/g$, preferably 200 $m^2/g$ to 400 $m^2/g$, more preferably 200 $m^2/g$ to 350 $m^2/g$ or 200 $m^2/g$ to 300 $m^2/g$.

The size ($L_c$) of the crystal of the carbon nanotubes may be 4.8 nm or more, and preferably 5.0 nm or more. If the size of the crystal is too small, the conductivity may not be improved even when the specific surface area is increased. Conversely, if the crystal size is too large, the conductivity may be lowered when the specific surface area is reduced. Therefore, the BET factor and the $L_c$ factor in this trade off relationship are combined to derive the relationship of Formula 1. From this, by adjusting BET and $L_c$ on the basis of the above Formula 1 in the manufacturing stage, it enables to efficiently improve the conductivity of the carbon nanotubes.

The $L_c$ value is a value indicating the crystal size of the carbon nanotubes and can be obtained from Scherrer equation. FIG. 1 shows a method for determining the crystal size. The Scherrer equation can be expressed as $L_c = K \lambda / B \times \cos\theta$, wherein K is a shape factor, $\lambda$ is the wavelength used for the measurement, $\theta$ corresponds to theta value at the position where the peak of the (002) plane appears, and B value is the full width at half maximum, which means a width of a peak at a height that is a half of a height of a vertical line where the vertical line is drawn from the peak value of the (002) plane to a horizontal line between the lowest points of the peak, wherein the smaller the B value is, the larger the $L_c$ value is. That is, as the width of the peak is narrowed, the crystal size increase, which may indicate that the degree of crystallization is increased.

The conductivity of the carbon nanotubes can be determined from powder resistivity of the carbon nanotube powder. The powder resistivity can be measured using a powder resistivity meter equipped with a 4-pin probe, by adjusting the pressure applied to the powder. According to one embodiment, a certain amount of carbon nanotubes are applied to the powder resistivity meter and the force is continuously applied thereto. The pressed density can be determined by measuring the density by pressing the particles. At this time, the powder resistivity is determined using a powder resistivity meter equipped with a 4-pin probe. The powder resistivity of the carbon nanotubes according to the present invention can be reduced as the pressed density is increased, which means that the conductivity of the carbon nanotube particles themselves is improved as the degree of compression increases. According to one embodiment, the carbon nanotubes according to the present invention may have a powder resistivity of 0.035 ohm·cm or less at a pressed density of 0.6 g/cc or less, preferably 0.03 ohm·cm, more preferably 0.025 ohm·cm or less. The carbon nanotubes of the present invention may have a powder resistivity of 0.012 ohm·cm or less at a pressed density of 1.0 g/cc or more, preferably 0.01 ohm·cm, and more preferably 0.009 ohm·cm or less.

The carbon nanotubes of the present invention satisfy the condition of the Formula 1. The carbon nanotubes satisfying the condition of the Formula 1 can exhibit a high conductivity due to the significant reduction in the powder resistivity. For example, the value from the Formula 1 and the powder resistivity may satisfy the following Formula 2.

$$-0.0004X + 0.041 \leq Y \leq -0.0004X + 0.044 \quad \text{[Formula 2]}$$

More preferably, the value from the Formula 1 and the powder resistivity may satisfy the following Formula 2-1.

$$-0.0004X + 0.042 \leq Y \leq -0.0004X + 0.043 \quad \text{[Formula 2-1]}$$

In the above Formulas,

X is a value of $L_c \times [\text{Specific surface area of CNT } (m^2/g)]^{1/2}$, and Y is powder resistivity of the carbon nanotubes (ohm·cm).

That is, since the powder resistivity can be deduced from the value of $L_c \times [\text{Specific surface area of CNT } (m^2/g)]^{1/2}$ in the above-mentioned Formula 1, it is possible to approximatively predict the conductivity of the carbon nanotubes to be produced without evaluation of the conductivity, and thus the high conductive carbon nanotubes can be produced more efficiently.

The carbon nanotubes according to the present invention may be produced by growing carbon nanotubes by a chemical vapor synthesis (CVD) method via decomposition of a carbon source using a supported catalyst having a metal supported thereon. The catalytic metal supported on the catalyst is not particularly limited as long as it promotes the growth of carbon nanotubes.

As the catalytic metal, for example, at least one metal selected from the group consisting of Groups 3 to 12 of the 18-element type periodic table recommended by IUPAC in 1990 can be mentioned. Of these, at least one metal selected from the group consisting of Groups 3, 5, 6, 8, 9 and 10 is preferable, and at least one metal selected from the group consisting of iron (Fe), nickel (Ni), cobalt (Co), chromium (Cr), molybdenum (Mo), tungsten (W), vanadium (V), titanium (Ti), ruthenium (Ru), rhodium (Rh), palladium (Pd), platinum (Pt) and rare earth elements is particularly preferred. The compounds containing a metal element serving as a catalyst, i.e., the catalytic metal precursors are not particularly limited as long as they are compounds containing catalytic metal, such as inorganic salts such as nitrates, sulfates and carbonates of catalytic metals, organic salts such as acetates, organic complexes such as acetylacetone complexes, organic metal compounds and the like.

It is widely known to control the reaction activity by using two or more of these catalytic metals and catalytic metal precursor compounds. For example, a combination of at least one element selected from iron (Fe), cobalt (Co) and nickel (Ni), an element selected from the group consisting of titanium (Ti), vanadium (V) and chromium (Cr), and an element selected from molybdenum (Mo) and tungsten (W) can be exemplified.

According to one embodiment, the metal catalyst further comprises cobalt (Co) as a main component and at least one metal selected from iron (Fe), molybdenum (Mo), chromium (Cr) and vanadium (V) as an auxiliary component.

According to another embodiment, the metal catalyst may include iron (Fe) as a main component and may further contain vanadium (V) substantially free of other metals.

The metal catalyst may contain 0.5 mol % to 5 mol % of the metal of the auxiliary component with respect to 10 mol % of the main component catalyst.

In the present invention, the catalyst may be produced by wet impregnation of the catalytic metals to a support such as $Al_2O_3$, $SiO_2$ or MgO.

In addition, specific examples of the catalyst may be one prepared by ultrasonication of a catalytically active metal precursor together with a support such as $Al(OH)_3$, $Mg(NO_3)_2$ or a colloidal silica.

The catalytic metals may be supported in an amount of 5 to 20 parts by weight, preferably 5 to 10 parts by weight, based on 100 parts by weight of the support.

The support may also be a carbon support. For example, the carbon support preferably has a specific surface area of 30 to 500 $m^2/g$, more preferably 60 to 500 $m^2/g$, and most preferably 100 to 300 $m^2/g$. Use of a material having a large specific surface area is preferable because it can support a large amount of iron, thereby increasing the loading amount. However, when the specific surface area is excessively large, the electrical conductivity of the resin composite tends to be lowered. As an example of another preferable carbon support, it is preferable to have a graphite surface. A carbon support having a graphite surface with smaller amount of surface functional group than a carbon support having a large oxygen content and surface functional groups is preferable.

A carbon support is more preferred in case that iron and vanadium are used as catalyst metals. The method of supporting iron and vanadium on the carbon support is not particularly limited. For example, a metal oxide or a metal salt may be supported on a support by impregnating the support in a non-aqueous solution (for example, methanol solution), in which the metal salt such as a salt of iron or vanadium is dissolved, sufficiently dispersing and mixing and then drying it. Alternatively, iron and vanadium may be prepared as respective solution and then the support may be impregnated therein respectively. A precipitate may be formed from a solution containing iron or vanadium, and the precipitate may be deposited on the support. The source of iron to be used is not particularly limited, but inorganic acid salts such as iron nitrate, iron sulfate and alum, complexes such as acetylacetonate complex, halides such as iron chloride, iron bromide and iron fluoride, and organic acid salts such as iron oxalate and iron stearate are suitably used because they are easy to prepare the solution of the metal salt used in the above-mentioned method. The source of vanadium to be used is not particularly limited, but oxide salts such as vanadate and vanadyl salt, chlorides such as vanadium chloride, oxides such as vanadium oxide, complexes such as acetylacetonate complex analogues are suitably used because of the ease of preparation and the cost of the solution of the metal salt used in above-mentioned method.

The catalyst may be prepared by a sol-gel method using a chelating agent such as citric acid or tartaric acid so that the catalytically active metal precursor can be easily dissolved in water, or by co-precipitation of a catalytically active metal precursor that is well soluble in water.

In the method of the present invention, the supported catalyst may be contacted with a carbon-containing compound (carbon source) under heating.

In the present invention, the carbon-containing compounds (carbon source) are not particularly limited. As the carbon compounds, general organic compounds such as $CCl_4$, $CHCl_3$, $CH_2Cl_2$, $CH_3Cl$, CO, $CO_2$ and $CS_2$ can be used. Particularly useful compounds include CO, $CO_2$, aliphatic hydrocarbons and aromatic hydrocarbons. In addition, carbon compounds comprising elements such as nitrogen, phosphorus, oxygen, sulfur, fluorine, chlorine, bromine or iodine can also be used.

Preferred examples of the carbon compounds include inorganic gases such as CO and $CO_2$, alkanes such as methane, ethane, propane, butane, pentane, hexane, heptane and octane, alkenes such as ethylene, propylene and butadiene, alkynes such as acetylene, monocyclic aromatic hydrocarbons such as benzene, toluene, xylene and styrene, polycyclic compounds having condensed rings such as indene, naphthalene, anthracene and phenanthrene, cyclopraffins such as cyclopropane, cyclopentane and cyclohexane, cycloolefins such as cyclopentene, cyclohexene, cyclopentadiene and dicyclopentadiene, and alicyclic hydrocarbon compounds having condensed rings such as steroids. Further, there may be used, for example, derivatives of hydrocarbons containing oxygen, nitrogen, sulfur, phosphorus, halogen and the like, for example oxygen-containing compounds such as methanol, ethanol, propanol and butanol, sulfur-containing aliphatic compounds such as methylthiol, methylethylsulfide and dimethylthioketone, sulfur-containing aromatic compounds such as phenylthiol and diphenylsulfide, sulfur-containing or nitrogen-containing heterocyclic compounds such as pyridine, quinoline, benzothiophene and thiophene, halogenated hydrocarbons such as chloroform, carbon tetrachloride, chloroethane and trichlorethylene, or, although not as a simple substance, natural gas, gasoline, kerosene, heavy oil, creosote oil, kerosene, terpine oil, camphor oil, pine oil, gear oil and cylinder oil may be used. It is also possible to use mixtures thereof.

Examples of the preferred carbon compounds include CO, methane, ethane, propane, butane, ethylene, propylene, butadiene, acetylene, benzene, toluene, xylene and mixtures thereof.

In the production of the carbon nanotubes of the present invention, it is preferable to use a carrier gas and a reducing gas in addition to these carbon compounds.

As the carrier gas, hydrogen, nitrogen, carbon dioxide, helium, argon, krypton, or a mixed gas thereof can be used to prevent the carbon nanotubes from being burned at a high temperature and to help decompose the carbon source (carbon containing compounds).

The reducing gas may be hydrogen ($H_2$) gas, ammonia ($NH_3$) or a mixed gas thereof, preferably hydrogen gas.

According to one embodiment, the conductivity of the carbon nanotubes can be controlled by controlling the concentration of the reducing gas contained in the entire reaction gas to be supplied in the production of the carbon nanotube. For example, the concentration of the reducing gas in the entire reaction gas may be 0 to 40%, preferably 0 to 20%, more preferably 0 to 10%.

In the process of preparing catalyst, it is preferable to use a supported catalyst obtained by impregnation. In the case that the supported catalyst is used, the bulk density of the catalyst itself is higher than that of the co-precipitated catalyst. Unlike the co-precipitated catalyst, the supported catalyst may have the reduced possibility of generation of fine particles due to attrition which may occur during the fluidization process because of fewer fine particles of 10 microns or less, and mechanical strength of the supported catalyst itself is also excellent, so that the operation of the reactor can be stabilized.

The aluminum-based support which can be used in the present invention may be at least one selected from the group consisting of $Al_2O_3$, AlO(OH) and $Al(OH)_3$, preferably alumina ($Al_2O_3$). Further, the aluminum (Al)-based support may further comprise at least one selected from the group consisting of $ZrO_2$, MgO, and $SiO_2$. The aluminum (AD-based support may have a spherical or potato-like shape and may be composed of a material having a porous structure, a molecular sieve structure, a honeycomb structure, or another suitable structure so as to have a relatively high surface area per unit mass or volume.

According to one embodiment, a method for producing a supported catalyst for CNT synthesis according to the present invention comprises:
(1) mixing a support with an aqueous solution containing a catalyst component precursor and an active component precursor to form an aqueous solution containing the catalyst precursor;
(2) impregnation aging the aqueous solution containing the catalyst precursor to obtain a mixture;
(3) vacuum drying the mixture to obtain a coating of the catalyst component and the active component on the surface of the support; and
(4) sintering the resultant product obtained by vacuum drying to form a supported catalyst.

The carbon nanotubes can be prepared by a chemical vapor synthesis method in which carbon nanotubes are grown by chemical vapor synthesis via decomposition of a carbon source using the catalyst.

Specifically, the chemical vapor synthesis method may be carried out by feeding the catalyst for synthesis of the carbon nanotube into a fluidized bed reactor and supplying at least one carbon source selected from saturated or unsaturated hydrocarbons having 1 to 4 carbon atoms, or a mixed gas of hydrogen and nitrogen with the carbon source in a process temperature range of 600 to 700° C., preferably 630 to 700° C., for example, 640 to 680° C., and more preferably 650 to 670° C. The step of growing the carbon nanotubes by injecting a carbon source into the catalyst for producing the carbon nanotubes may be performed for 30 minutes to 8 hours.

According to one embodiment, the carbon nanotubes may contain 6 mass % or less of Fe and 3 mass % or less of V as metal elements other than carbon.

The carbon nanotubes are prepared by contacting a carbon-containing compound with a catalyst carrying iron (Fe) and vanadium (V) on a carbon support which has a specific surface area of 30 to 500 m²/g. The amount of iron supported in the catalyst is 5 to 40 mass %. The concentration of vanadium (V) in the catalyst is 20 to 100 mol % with respect to the moles of iron. Using a carrier gas in addition to the carbon-containing compound, the amount of the carbon-containing compound to be supplied may be 30 to 90 vol % calculated as {(flow rate of carbon-containing compound)/(flow rate of carrier gas+flow rate of carbon-containing compound)}×100 (vol %).

The carbon nanotube produced using the supported catalyst according to the present invention can be obtained in the form of a potato or spherical aggregate having a particle size distribution value ($D_{cnt}$) of 0.5 to 1.0. For example, a catalyst obtained by impregnating catalyst components and active components into a spherical or potato-shaped granular support and sintering it, has a spherical or potato-like shape without a large change in shape, and also the aggregate of carbon nanotubes grown on such a catalyst has a spherical or potato-like shape only having a larger diameter without a large change in shape. Here, the spherical shape or the potato shape refers to a three-dimensional shape such as a sphere or an ellipsoid having an aspect ratio of 1.2 or less.

The particle size distribution value ($D_{cnt}$) of the carbon nanotubes is defined by the following Formula 3:

$$D_{cnt} = [D_{90} - Dn_{10}]/Dn_{50}$$ [Formula 3]

wherein $Dn_{90}$ is a number average particle diameter which is measured based on 90% in an absorption mode using a Microtrac particle diameter analyzer after CNTs are immersed in distilled water and then allowed to stand for 3 hours, $Dn_{10}$ is a number average particle diameter measured based on 10% under the same conditions, and $Dn_{50}$ is a number average particle diameter measured based on 50% under the same conditions.

The particle diameter distribution may be preferably 0.55 to 0.95 and more preferably 0.55 to 0.9.

In the present invention, the carbon nanotubes may be of a non-bundle type or a bundle type having ellipticity of 0.9 to 1. The term 'bundle' used in the present invention refers to a bundle or rope shape in which a plurality of carbon nanotubes are arranged side by side or intertwined, unless otherwise specified. A 'non-bundle or entangled type' refers to a form not having certain shapes such as a bundle or a rope shape. In case of the bundle type, the CNT bundle may have a diameter of 1 to 50 μm.

The ellipticity is defined by the following Formula 4.

Ellipticity=the shortest diameter passing through center of CNT/the longest diameter passing through center of CNT. [Formula 4]

In the present invention, the carbon nanotube has a bulk density of 80 to 250 kg/m³. Specifically, the bulk density is defined by the following Formula 5.

Bulk density=CNT weight (kg)/CNT volume (m³) [Formula 5]

In the present invention, the carbon nanotube has an average particle diameter of 100 to 800 μm and a strand diameter of the carbon nanotube is 10 to 50 nm.

According to one embodiment, the method may further comprise a purification process of removing residual metals generated from the catalytic metals used in the manufacturing process of the carbon nanotubes as described above. By purifying the carbon nanotubes, the degraded physical properties due to metal impurities such as residual metals can be improved.

For example, the purification process may utilize reaction of a residual metal with a chlorine-containing compound at a high temperature to chlorinate the residual metal and evaporate it. Such a purification process utilizes a high-temperature reaction in the vapor phase, so that there is an advantage that any physical damage is not caused to the produced carbon nanotube.

According to one embodiment, the chlorine-containing compound may be chlorine ($Cl_2$) or trichloromethane ($CHCl_3$) gas. Since the chlorine-containing compound has low reactivity with the carbon nanotubes, the damage to the produced carbon nanotubes can be further reduced.

After the chlorination step, the evaporation and removal of the chlorinated metal may be performed in an inert gas or a vacuum atmosphere for 30 minutes to 300 minutes in a temperature range in which only the chlorinated residual metals can be removed without affecting the carbon nanotubes. In addition, the evaporation and removal of the chlorinated metal may be carried out while alternately forming a vacuum atmosphere and an inert gas atmosphere.

The metal impurity content in the carbon nanotubes from which the residual metals are removed by the above method may be 50 ppm or less, and the metal impurities in the carbon nanotubes can be measured by ICP analysis. According to one embodiment, the carbon nanotubes may be produced by using a metal catalyst containing metals such as cobalt (Co), iron (Fe), vanadium (V) as a main component.

The content of the each of metals as the main component after purification may be 40 ppm or less, respectively, and the total content of the metals may be 50 ppm or less.

The carbon nanotube of the present invention has high conductivity, so that a polymer composite exhibiting high conductivity can be provided.

The polymer resin included in the polymer composite can be used without limitation as long as it can be mixed with the carbon nanotubes to form a conductive polymer resin. For example, a thermoplastic resin can be used.

The thermoplastic resin that can be used in the present invention is not particularly limited as long as it is used in the art. As the thermoplastic resin, for example, at least one selected from the group consisting of a polycarbonate resin, a polypropylene resin, a polyamide resin, an aramid resin, an aromatic polyester resin, a polyolefin resin, a polyester carbonate resin, a polyphenylene ether resin, a polyphenylene sulfide resin, a polysulfone resin, a polyether sulfone resin, a polyarylene resin, a cycloolefin resin, a polyetherimide resin, a polyacetal resin, a polyvinyl acetal resin, a polyketone resin, a polyether ketone resin, a polyether ether ketone resin, a polyaryl ketone resin, a polyether nitrile resin, a liquid crystal resin, a polybenzimidazole resin, a polyparabanic acid resin, a vinyl-based polymer or copolymer resin obtained by polymerizing or copolymerizing at least one vinyl monomers selected from the group consisting of an aromatic alkenyl compound, methacrylic acid ester, acrylic acid ester and a vinyl cyanide compound, a diene-aromatic alkenyl compound copolymer resin, a vinyl cyanide-diene-aromatic alkenyl compound copolymer resin, an aromatic alkenyl compound-diene-vinyl cyanide-N-phenyl maleimide copolymer resin, a vinyl cyanide-(ethylene-diene-propylene(EPDM))-aromatic alkenyl compound copolymer resin, polyolefin, a vinyl chloride resin and a chlorinated vinyl chloride resin can be used. The specific types of these resins are well known in the art and can be suitably selected by those skilled in the art.

The polyolefin resin may be, for example, polypropylene, polyethylene, polybutylene, and poly(4-methyl-1-pentene), or a combination thereof, but is not limited thereto. In one embodiment, examples of the polyolefin include polypropylene homopolymer (e.g., atactic polypropylene, isotactic polypropylene, and syndiotactic polypropylene), polypropylene copolymer (e.g., polypropylene random copolymer), and mixtures thereof. Suitable polypropylene copolymer includes, but is not limited to, random copolymer prepared by the polymerization of propylene in the presence of comonomers selected from the group consisting of ethylene, but-1-ene (i.e., 1-butene), and hex-1-ene (i.e., 1-hexene). In the polypropylene random copolymer, the comonomers may be present in any suitable amount, but are typically present in an amount of about 10 wt % or less (e.g., from about 1 to about 7 wt %, or from about 1 to about 4.5 wt %).

The polyester resin refers to a homopolyester or copolyester which is a polycondensate of a dicarboxylic acid component skeleton and a diol component skeleton. Representative examples of the homopolyester include polyethylene terephthalate, polypropylene terephthalate, polybutylene terephthalate, polyethylene-2,6-naphthalate, poly-1,4-cyclohexanedimethylene terephthalate, polyethylene diphenylate, and the like. Particularly, polyethylene terephthalate is preferable because it can be used in many applications due to its low price. The copolyester is defined as a polycondensate of at least three components selected from components having a dicarboxylic acid skeleton and components having a diol skeleton, as exemplified below. Examples of the components having a dicarboxylic acid skeleton include terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenylsulfone dicarboxylic acid, adipic acid, sebacic acid, dimeric acid, cyclohexane dicarboxylic acid and ester derivatives thereof, and the like. Examples of the components having a glycol skeleton include ethylene glycol, 1,2-propanediol, 1,3-butanediol, 1,4-butanediol, 1,5-pentanediol, diethylene glycol, polyalkylene glycol, 2,2-bis(4'-6-hydroxyethoxyphenyl) propane, isosorbate, 1,4-cyclohexanedimethanol, spiroglycol and the like.

As the polyamide resin, a nylon resin, a nylon copolymer resin, and mixtures thereof can be used. The nylon resin may be polyamide-6 (nylon 6) obtained by ring-opening polymerization of commonly known lactams such as ε-caprolactam or ω-dodecaractam; nylon polymerization products obtainable from amino acids such as aminocaproic acid, 11-aminoundecanoic acid, and 12-aminododecanoic acid; nylon polymers obtainable by polymerization of an aliphatic, alicyclic or aromatic diamine such as ethylenediamine, tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonahexamethylenediamine, meta-xylenediamine, para-xylenediamine, 1,3-bisaminom ethylcyclohexane, 1,4-bisaminomethylcyclohexane, 1-amino-3-aminomethyl-3,5,5-trimethyl cyclohexane, bis (4-aminocyclohexyl)methane, bis(4-methylcyclohexyl) methane, 2,2-bis(4-aminocyclohexyl)propane, bis(aminopropyl)piperazine or aminoethylpiperidine, with an aliphatic, alicyclic or aromatic dicarboxylic acid such as adipic acid, sebacic acid, azelaic acid, terephthalic acid, 2-chloroterephthalic acid and 2-methylterephthalic acid; and copolymers or mixtures thereof. Examples of the nylon copolymer include copolymer of polycaprolactam (nylon 6) and polyhexamethylene sebacamide (nylon 6,10), copolymer of polycaprolactam (nylon 6) and polyhexamethylene adipamide (nylon 66), copolymer of polycaprolactam (nylon 6) and polylauryllactam (nylon 12), and the like.

The polycarbonate resin may be prepared by reacting a diphenol with phosgene, a halogen formate, a carbonic ester, or a combination thereof. Specific examples of the diphenol include hydroquinone, resorcinol, 4,4'-dihydroxydiphenyl, 2,2-bis(4-hydroxyphenyl)propane (also referred to as 'bisphenol-A'), 2,4-bis(4-hydroxyphenyl)-2-methylbutane, bis (4-hydroxyphenyl)methane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hyroxyphenyl)propane, bis(4-hydroxyphenyl)sulfoxide, bis(4-hydroxyphenyl)ketone, bis (4-hydroxyphenyl)ether, and the like. Of these, for example, 2,2-bis(4-hydroxyphenyl)propane, 2,2-bis(3,5-dichloro-4-hyroxyphenyl)propane or 1,1-bis(4-hydroxyphenyl)cyclohexane can be preferably used, and 2,2-bis(4-hyroxyphenyl) propane can be more preferably used.

The polycarbonate resin may be a mixture of copolymers prepared from two or more diphenols. As the polycarbonate resin, there may be used, for example a linear polycarbonate resin, a branched polycarbonate resin, or a polyester carbonate copolymer resin.

Examples of the linear polycarbonate resin include a bisphenol-A type polycarbonate resin and the like. Examples of the branched polycarbonate resin include those prepared by reacting a polyfunctional aromatic compound such as trimellitic anhydride, trimellitic acid and the like with a diphenol and a carbonate. The polyfunctional aromatic compound may be contained in an amount of 0.05 to 2 mol % based on the total amount of the branched polycarbonate resin. Examples of the polyester carbonate copolymer resin include those prepared by reacting a difunctional carboxylic acid with a diphenol and a carbonate. As the carbonate, there may be used, for example diaryl carbonate such as diphenyl carbonate, ethylene carbonate and the like.

As the cycloolefin-based polymer, there may be exemplified ethylene-cycloolefin copolymers available under the trade name "Apel" (Mitsui Chemicals), norbornene-based polymers available under the trade name "Aton" (JSR), and norbornene-based polymers available under the trade name "Zeonoa" (Nippon Zeon).

The polymer composite material according to the present invention may contain carbon nanotubes in an amount of 5 wt % or less, preferably 4 wt % or less, more preferably 3 wt % or less, based on the total weight of the polymer composite material.

In addition, the polymer composite material may have a reduced surface resistivity to $10^3$ ohm/sq or less by merely containing 0.02 wt % or more of carbon nanotubes. If the carbon nanotubes are contained in an amount of 0.05 wt % or more, more preferable surface resistivity can be obtained.

In the polymer composite material according to the present invention, the conductivity of the composite material can be remarkably improved by merely adding a small amount of carbon nanotubes. Generally, in the production of a conductive polymer composite material, excessive carbon nanotubes added to improve the conductivity may cause the mechanical properties to be deteriorated. Therefore, it is necessary to be able to achieve a high conductivity by merely adding a small amount of carbon nanotubes. For this purpose, it is important to increase the conductivity of the carbon nanotube itself. However, conventionally, for measurement of the conductivity of the produced carbon nanotubes, there was an inconvenience in that it is necessary to prepare a small amount of a polymer resin composite sample to measure surface resistivity thereof. Accordingly, in the present invention, a value obtained by combining a BET value known as a factor related to conductivity of carbon nanotubes and a crystal size ($L_c$) measured from XRD measurement is used as a conductivity index. Therefore, the high conductive carbon nanotubes can be produced more efficiently by predicting and evaluating the conductivity of the carbon nanotubes without preparing the polymer composite sample. The conductive polymeric carbon composite material having improved conductivity can be provided by mixing the high conductive carbon nanotubes produced by this method with the polymer resins.

In addition, the high conductive carbon nanotube of the present invention can be used as a material of a lithium secondary battery to improve the performance by lowering the internal resistivity of the battery. Particularly, it can be used as conductive material for positive electrode to improve the output characteristics and life characteristics.

As the cathode active material of the lithium secondary battery, any known cathode active material for a lithium secondary battery may be used. For example, a lithium-containing transition metal oxide may be preferably used, for example any one selected from the group consisting of $Li_xCoO_2(0.5<x<1.3)$, $Li_xNiO_2(0.5<x<1.3)$, $Li_xMnO_2(0.5<x<1.3)$, $Li_xMn_2O_4(0.5<x<1.3)$, $Li_x(Ni_aCo_bMn_c)O_2(0.5<x<1.3, 0<a<1, 0<b<1, 0<c<1, a+b+c=1)$, $Li_xNi_{1-y}Co_yO_2(0.5<x<1.3, 0<y<1)$, $Li_xCo_{1-y}Mn_yO_2(0.5<x<1.3, 0\leq y<1)$, $Li_xNi_{1-y}Mn_yO_2(0.5<x<1.3, O\leq y<1)$, $Li_x(Ni_aCo_bMn_c)O_4(0.5<x<1.3, 0<a<2, 0<b<2, 0<c<2, a+b+c=2)$, $Li_xMn_{2-z}Ni_zO_4(0.5<x<1.3, 0<z<2)$, $Li_xMn_{2-z}Co_zO_4(0.5<x<1.3, 0<z<2)$, $Li_xCoPO_4(0.5<x<1.3)$ and $Li_xFePO_4(0.5<x<1.3)$ or a mixture of two or more thereof. The lithium-containing transition metal oxide may be coated with a metal such as aluminum (Al) or a metal oxide. In addition to the lithium-containing transition metal oxide, a sulfide, a selenide and a halide may also be used.

The carbon nanotubes according to the present invention may be contained in an amount of 5 wt % or less, preferably 3 wt % or less based on the weight of the cathode active material, and may be contained in an amount of at least 1 wt % or more, preferably 1.5 wt % or more, more preferably in an amount of 2 wt % or more.

In addition, the cathode active material:the carbon nanotube:the binder may be mixed in a weight ratio of 100:0.2 to 5:0.2 to 5, preferably 100:0.5 to 5:0.5 to 5.

In the present invention, by using the high conductive carbon nanotubes according to the present invention as the conductive material of the cathode of the lithium secondary battery, the deteriorated output characteristics due to an increase in resistance as the structure of the cathode become unstable in the discharge state can be compensated for as a conductive compound having excellent conductivity. From this, the output characteristics in the low SOC section are improved and the available SOC section is broadened, thereby realizing a lithium secondary battery having high capacity and high stability. For example, the lithium secondary battery using the carbon nanotubes according to the present invention may have internal resistivity of the battery of 1.3 ohm or less under the condition of SOC of 10 to 20.

From the preparation of the electrodes, it can be obtained a lithium secondary battery having electrolytic materials and a separator interposed between the anode and the cathode, which are commonly used in the art.

For example, in the present invention, it is possible to provide a lithium secondary battery including a cathode, an anode described above, and a separator interposed between the cathode and the anode.

The lithium salt may be contained in the electrolyte solution as an electrolyte. The lithium salt may be any of those commonly used for an electrolyte for a lithium secondary battery. For example, the anion of the lithium salt may be at least one selected from the group consisting of F, cr, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

As the organic solvent contained in the electrolyte solution used in the present invention, those commonly used for an electrolyte solution of a lithium secondary battery may be used without limitation. Representative examples include propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxyethane, diethoxyethane, vinylene carbonate, sulfolane, gamma-butyrolactone, propylene sulfite and tetrahydrofuran, or a mixture of two or more thereof, and the like. Among the above-described carbonate-based organic solvents, ethylene carbonate and propylene carbonate which are cyclic carbonates, are high viscosity organic solvents and may be preferably used because they allow the lithium salt in the electrolyte solution to be easily dissociated due to their high dielectric constant. A mixture of these cyclic carbonates with linear carbonates having low viscosity and low dielectric constant, such as dimethyl carbonate and diethyl carbonate in an appropriate ratio may be more preferably used in the view of obtaining an electrolyte solution having a high electrical conductivity.

Alternatively, the electrolyte solution in accordance with the present invention may further contain an additive such as an overcharge inhibitor which is commonly used in the electrolyte solution.

The separator may be formed of a commonly used porous polymer film, for example, a porous polymer film prepared from a polyolefin-based polymer such as ethylene homopolymer, propylene homopolymer, ethylene-butene copolymer, ethylene-hexene copolymer or ethylene-methacrylate copolymer, in a single layer or a laminate form. Alternatively, the separator may be formed of a commonly used porous nonwoven fabric such as a nonwoven fabric made of high-melting point glass fiber, polyethylene terephthalate fiber, etc., but is not limited thereto.

A case for battery of the present invention may have various shapes which are commonly used in the art, without particular limitation. For example, it may have a cylindrical can shape, an angled shape, a pouch shape or a coin shape.

The present invention will be explained in more detail with reference to the following examples, including comparative examples. However, these examples are provided for illustrative purposes only and are not intended to limit the scope of the invention.

<Preparation of Carbon Nanotubes>

Example 1

A metal catalyst containing Al/Co/V in a molar ratio of 10:1:0.1 for CNT synthesis was used to synthesize carbon nanotubes in a laboratory scale fixed bed reactor. Specifically, the catalyst for CNT synthesis was loaded in the middle of a quartz tube having an inner diameter of 55 mm. Then, the temperature was raised to 650° C. under nitrogen atmosphere and maintained. Synthesis was carried out for 2 hours under the flow of hydrogen gas and ethylene gas at a flow rate of 60 sccm to prepare entangled (non-bundle type) carbon nanotubes.

Example 2

A metal catalyst containing Al/Co/V in a molar ratio of 10:0.8:0.08 for CNT synthesis was used to synthesize carbon nanotubes in a laboratory scale fixed bed reactor. Specifically, the catalyst for CNT synthesis was loaded in the middle of a quartz tube having an inner diameter of 55 mm. Then, the temperature was raised to 650° C. under nitrogen atmosphere and maintained. Synthesis was carried out for 2 hours under the flow of hydrogen gas and ethylene gas at a flow rate of 60 sccm to prepare entangled (non-bundle type) carbon nanotubes.

Example 3

A metal catalyst containing Al/Co/V in a molar ratio of 10:0.8:0.05 for CNT synthesis was used to synthesize carbon nanotubes in a laboratory scale fixed bed reactor. Specifically, the catalyst for CNT synthesis was loaded in the middle of a quartz tube having an inner diameter of 55 mm. Then, the temperature was raised to 650° C. under nitrogen atmosphere and maintained. Synthesis was carried out for 2 hours under the flow of ethylene gas at a flow rate of 60 sccm to prepare entangled (non-bundle type) carbon nanotubes.

Example 4

A predetermined amount of carbon material was filled in a graphite crucible and heat-treated in argon gas at 2800° C. for 30 minutes. The obtained sample was used to prepare a catalyst after cracking.

A predetermined amount of ferric nitrate nonahydrate was dissolved in methanol, and a predetermined amount of ammonium metavanadate was dissolved therein. The solution was dropped on a support and kneaded to obtain a paste. The paste was dried at 100° C. for 4 hours under reduced pressure and pulverized to obtain a catalyst. Here, the predetermined amount (added amount) of ferric nitrate was calculated so as to be {(mass of iron)/(mass of iron+mass of support)}×100=mass of iron % with respect to the mass of support and a predetermined amount (added amount) of ammonium metavanadate was calculated from the molar amount and the mass of iron.

Ketjen Black EC-300J was heat-treated at 2800° C. under argon atmosphere and then cracked to prepare a carbon support.

20 mass % of ferric nitrate nonahydrate was dissolved in methanol, and 80 mass % of ammonium metavanadate was dissolved therein. Then, the solution was dropped on the carbon support and kneaded to obtain a paste. The paste was dried at 100° C. for 4 hours under reduced pressure and pulverized to obtain a catalyst.

The content (added amount) of ferric nitrate was calculated so as to be {(mass of iron)/(mass of iron+mass of support)}×100=mass of iron % with respect to the mass of support and a predetermined amount (added amount) of ammonium metavanadate was calculated from the molar amount and the mass of iron.

The catalyst thus obtained was loaded in the middle of a quartz tube having an inner diameter of 55 mm. Then, the temperature was raised to 650° C. under nitrogen atmosphere and maintained. Synthesis was carried out for 2 hours under the flow of hydrogen gas and ethylene gas at a flow rate of 60 sccm to prepare entangled (non-bundle type) carbon nanotubes.

Example 5

Carbon nanotubes were prepared in the same manner as in Example 4 except for using a heat-treated product at 2800° C. of carbon black•show black•MAF (manufactured by CABOT JAPAN K. K.).

Comparative Example 1

A metal catalyst containing Al/Co/V in a molar ratio of 10:1:0.1 for CNT synthesis was used to synthesize carbon nanotubes in a laboratory scale fixed bed reactor. Specifically, the catalyst for CNT was loaded in the middle of a quartz tube having an inner diameter of 55 mm. Then, the temperature was raised to 680° C. under nitrogen atmosphere and maintained. Synthesis was carried out for 2 hours under the flow of hydrogen gas and ethylene gas at a flow rate of 60 sccm to prepare entangled (non-bundle type) carbon nanotubes.

Comparative Example 2

A metal catalyst containing Al/Co/Fe/V in a molar ratio of 10:0.5:0.5:0.1 for CNT synthesis was used to synthesize carbon nanotubes in a laboratory scale fixed bed reactor. Specifically, the catalyst for CNT synthesis was loaded in the middle of a quartz tube having an inner diameter of 55 mm. Then, the temperature was raised to 650° C. under nitrogen atmosphere and maintained. Synthesis was carried out for 2 hours under the flow of hydrogen gas and ethylene gas at a flow rate of 60 sccm to prepare entangled (non-bundle type) carbon nanotubes.

Comparative Example 3

A metal catalyst containing Al/Co/V in a molar ratio of 10:1.0:0.1 for CNT synthesis was used to synthesize carbon nanotubes in a laboratory scale fixed bed reactor. Specifically, the catalyst for CNT synthesis prepared in the above process was loaded in the middle of a quartz tube having an inner diameter of 55 mm. Then, the temperature was raised to 640° C. under nitrogen atmosphere and maintained. Synthesis was carried out for 2 hours under the flow of hydrogen gas and ethylene gas at a flow rate of 60 sccm to prepare entangled (non-bundle type) carbon nanotubes.

Experimental Example 1: Analysis of Specific Surface Area and Crystallinity of CNT The specific surface area of the CNTs prepared in Examples 1 to 5 and Comparative Examples 1 to 3 was measured. The specific surface area was measured by a BET method. Specifically, the amount of nitrogen gas adsorbed at a liquid nitrogen temperature (77 K) was calculated using a BELSORP-mini II (BEL, Japan) instrument.

X-ray diffraction (XRD) analysis was carried out to determine the crystallinity of the CNTs prepared in Examples and Comparative Examples. The XRD analysis was performed using a Bruker AXS D4 Endeavor XRD (voltage: 40 kV, current: 40 mA) using Cu Kα radiation (wave length: 1.54 Å) at scanning speed of 0.02/min from 10 degrees (°) to 80 degrees (°). The full width at half maximum of the crystal peak appearing in the vicinity of 23 degrees (°) to 28 degrees (°) in 2θ was determined by the measurement method in FIG. 1 and the $L_c$ value was obtained from the Scherrer equation.

Table 1 below shows specific surface area (BET) and $L_c$ value as measured by the above method. The specific surface area (BET) and the $L_c$ value of the CNT were used to calculate a value of $L_c \times$[Specific surface area of CNT $(cm^2/g)]^{1/2}$ of the CNT. The results are shown in Table 1.

Experimental Example 2: Measurement of Powder Resistivity of CNT

The electrical conductivity was measured using a powder resistivity meter (MCP-PD51) equipped with a 4-pin probe while adjusting the pressure applied to the powder. FIG. 2 shows the change of the powder resistivity according to the pressed density of the compressed powder while adjusting the compression pressure. As shown in FIG. 2, as the pressed density increases, the powder resistivity tends to decrease. In Table 1 below, the powder resistivity is a value at the pressed density of 1 g/cc.

TABLE 1

| | BET (m²/g) | $L_c$ (nm) | L * (BET)$^{1/2}$ | Powder resistivity (ohm · cm) |
|---|---|---|---|---|
| Example 1 | 249 | 5.6 | 88.37 | 0.0077 |
| Example 2 | 216 | 5.7 | 83.77 | 0.0088 |
| Example 3 | 270 | 5.0 | 82.16 | 0.0100 |
| Example 4 | 262 | 5.0 | 80.93 | 0.0101 |
| Example 5 | 251 | 5.1 | 80.79 | 0.0104 |
| Comparative Example 1 | 220 | 5.2 | 77.13 | 0.0120 |
| Comparative Example 2 | 197 | 5.1 | 71.58 | 0.0128 |
| Comparative Example 3 | 245 | 4.4 | 68.87 | 0.0147 |

As shown in Table 1, all of Example 1 to Example 5 satisfy the correlation of Formula 1, that is, all of them exhibit L*(BET)$^{1/2}$ of 80 or more, and thus exhibit a powder resistivity of 0.01 ohm·cm or less.

In general, as the BET value is high, the conductivity tends to increase. But, in case of Comparative Example 3, although the value is smaller than that of Example 2, the crystallinity is remarkably low so that the powder resistivity is very large. Therefore, the present invention can provide a method of optimizing the conductivity of CNT by introducing not only BET as a factor for improving the conductivity but also a crystal size and by combining two factors to prepare a specific criterion.

The correlation between the L*(BET)$^{1/2}$ and the powder resistivity measured in Examples 1 to 3 satisfies the Formula 2. From FIG. 3, it can be seen that the CNTs of Examples 1 to 3 are in the range satisfying the relation of the Formula 2.

From the results shown in Table 1 and FIG. 3, the carbon nanotube satisfying the condition of the Formula 1 of the present invention has a powder resistivity of 0.012 ohm·cm or less. From this, it can be seen that the carbon nanotubes can be used as a conductive material of a carbon composite material having high conductivity.

Example 6: Production of PC-CNT Composite Material 0.5 wt %, 0.8 wt %, 1.2 wt % and 1.5 wt % of the carbon nanotubes prepared in Example 1 were mixed with polycarbonate (PC), respectively. Each of the obtained mixtures was extruded from a biaxial extruder (L/D=42, φ=40 mm) to prepare pellets having a size of 0.2 mm×0.3 mm×0.4 mm. The prepared pellets were injected from an injection machine to prepare specimens having a thickness of 3.2 mm, a length of 12.7 mm and a dog-bone shape.

Example 7: Production of PC-CNT Composite Material 0.5 wt %, 0.8 wt %, 1.2 wt % and 1.5 wt % of the carbon nanotubes prepared in Example 2 were mixed with polycarbonate (PC), respectively. Each of the obtained mixtures was extruded from a biaxial extruder (L/D=42, φ=40 mm) to prepare pellets having a size of 0.2 mm×0.3 mm×0.4 mm. The prepared pellets were injected from an injection machine to prepare specimens having a thickness of 3.2 mm, a length of 12.7 mm and a dog-bone shape.

Comparative Example 4: Production of PC-CNT Composite Material 1 wt %, 2 wt %, 3 wt % and 4 wt % of the carbon nanotubes prepared in Comparative Example 3 were mixed with polycarbonate (PC), respectively. Each of the obtained mixtures was extruded from a biaxial extruder (L/D=42, φ=40 mm) to prepare pellets having a size of 0.2 mm×0.3 mm×0.4 mm. The prepared pellets were injected from an injection machine to prepare specimens having a thickness of 3.2 mm, a length of 12.7 mm and a dog-bone shape.

Experimental Example 3: Measurement of Surface Resistivity of PC-CNT Composite Material The surface resistivity of the specimens prepared in Examples 6 to 7 and Comparative Example 4 was measured.

The surface resistivity of the specimens was measured in accordance with ASTM D257 using SRM-100 manufactured by PINION. The measurement results are shown in FIG. 4.

From the FIG. 4, it can be seen that the surface resistivity of the composite material produced from the CNTs in Examples 1 and 2, which were used in a smaller amount than the CNTs in Comparative Example 3, was significantly lower than that of composite material produced from the CNT in Comparative Example 3. Therefore, it was found that the surface resistivity tends to be decreased as the amount of CNT is increased. However, for Comparative Example 3, the surface resistivity was more than $10^3$ ohm/sq at the carbon content of 1 wt % and the deceleration rate of the surface resistivity according to the carbon content was also significantly lower than that of Examples 1 and 2. That is, in order to lower the surface resistivity by about 10 times, at least 1 wt % of carbon nanotubes should be added for Comparative Example 3, but only about 0.5 wt % of carbon nanotubes are required in case of CNT according to the present invention. This is very effective in solving the problem of deteriorating the physical and mechanical properties of the polymer composite which is generated when a large amount of CNT is added. Thereby, it is possible to produce a polymer composite having improved mechanical properties and electrical characteristics.

Example 8: Preparation of Lithium Secondary Battery (Preparation of Cathode)

$LiCoO_2$, CNT prepared in Example 1 and PVdF binder were dispersed in NMP at a weight ratio of 95:2.5:2.5 to prepare a slurry. The slurry was coated on an aluminum foil and sufficiently dried at 130° C. and pressed to prepare a cathode. The thickness of the cathode was about 140 μm.

(Preparation of Anode)

To a composition comprising graphite and a binder, a conductive carbon was introduced (graphite:binder (SBR): conductive carbon (Super-P)=98.6:1:0.4 weight ratio). The mixture was dispersed in water to prepare a slurry. The slurry was coated on an aluminum foil and sufficiently dried at 130° C. and pressed to prepare an anode. The thickness of the anode was about 135 μm.

(Assembly of Battery)

A polypropylene separator was laminated between the cathode and the anode and housed in a battery case. Then, an electrolyte solution of ethylene carbonate (EC):fluoroethylene carbonate (FEC)=90:10 weight ratio was introduced. The battery case was sealed to finally produce a battery.

Comparative Example 5: Preparation of Cathode of Lithium Secondary Battery

The procedure of Example 6 was repeated except that the CNT of Comparative Example 1 was used.

Comparative Example 6: Preparation of Cathode of Lithium Secondary Battery

The procedure of Example 6 was repeated except that the CNT of Comparative Example 3 was used.

Experimental Example 4: Measurement of Internal Resistivity of Li-Ion Battery

In order to measure the internal resistivity of the Li-ion batteries prepared in Example 8 and Comparative Examples 5 and 6, internal resistivity at a cut-off current of 2 V was measured by applying a discharge current pulse at 6.5 C rate for 10 seconds in a state where the capacity of the battery was discharged to 90% (SOC 15) at 25° C. The results were shown in FIG. 5.

As shown in FIG. 5, the internal resistivity of the Li-ion battery containing the CNT of the present invention as a conductive material was significantly reduced. Generally, an increase in the internal resistivity of the Li-ion battery may deteriorate the output characteristics and lifetime characteristics of the battery. However, the Li-ion battery of the present invention uses the high conductive carbon nanotubes as the conductive material of the cathode, so that the problem of increasing the resistivity at low SOC can be solved. From this, a high capacity Li-ion battery can be provided.

What is claimed is:

1. Carbon nanotubes satisfying the condition of the following Formula 1:

$$L_c \text{ (nm)} \times [\text{Specific surface area of CNT (m}^2\text{/g)}]^{1/2} > 80 \quad \text{[Formula 1]}$$

wherein, $L_c$ is crystal size measured by X-ray diffraction method, wherein the carbon nanotubes have the powder resistivity of 0.012 ohm·cm or less at pressed density of 1 g/cc or more, and wherein the specific surface area of the carbon nanotubes is 200 m²/g to 500 m²/g.

2. The carbon nanotubes according to claim 1, wherein the value of $L_c$ is 4.38 nm or more.

3. The carbon nanotubes according to claim 1, wherein the carbon nanotubes satisfy a correlation of the following Formula 2:

$$-0.0004X + 0.041 \leq Y \leq -0.0004X + 0.044 \quad \text{[Formula 2]}$$

wherein,

X is a value of $L_c \times [\text{Specific surface area of CNT (m}^2\text{/g)}]^{1/2}$, and Y is powder resistivity of the carbon nanotubes (ohm·cm).

4. The carbon nanotubes according to claim 1, wherein the carbon nanotubes have the powder resistivity of 0.035 ohm·cm or less at pressed density of 0.6 g/cc or less.

5. The carbon nanotubes according to claim 1, wherein the carbon nanotubes contain 6 mass % or less of Fe and 3 mass % or less of V as metal elements other than carbon.

6. The carbon nanotubes according to claim 5, wherein the carbon nanotubes are prepared by contacting a carbon-containing compound with a catalyst carrying iron (Fe) and vanadium (V) on a carbon support having a specific surface area of 30 to 500 m²/g, the amount of iron supported in the catalyst is 5 to 40 mass %, the concentration of vanadium (V) in the catalyst is 20 to 100 mol % with respect to the moles of iron, and the carbon nanotubes are prepared using a carrier gas in addition to the carbon-containing compound, wherein an amount of the carbon-containing compound to be supplied is 30 to 90 vol % calculated as {(flow rate of carbon-containing compound)/(flow rate of carrier gas+flow rate of carbon-containing compound)}×100 (vol %).

7. A polymer composite comprising the carbon nanotubes of claim 1.

8. The polymer composite according to claim 7, wherein the polymer composite has surface resistivity of $10^3$ ohm/$cm^2$ or less at a carbon nanotube content of 0.02 wt % or more.

9. The polymer composite according to claim 7, wherein the polymer composite comprises 0.02 wt % to 5 wt % of the carbon nanotubes.

10. A lithium battery comprising the carbon nanotubes according to claim 1.

11. The lithium battery according to claim 10, comprising the carbon nanotubes as a conductive material of a cathode.

12. The lithium battery according to claim 11, wherein the lithium battery has internal resistivity of the battery of 1.3 ohm or less under the condition of SOC of 10 to 20.

13. The lithium secondary battery according to claim 11, wherein the carbon nanotubes are present in an amount of 1 to 5 wt % based on weight of the cathode active material.

14. The lithium secondary battery according to claim 11, wherein carbon nanotubes are present in an amount of 0.2 to 5 wt % based on weight of the cathode active material.

15. A method for evaluating conductivity of carbon nanotubes having a powder resistivity of 0.012 ohm·cm or less at pressed density of 1 g/cc or more, and the specific surface area of the carbon nanotubes is 200 $m^2$/g to 500 $m^2$/g, using specific surface area and crystal size of carbon nanotubes as an evaluation factor of conductivity according to the following Formula 1:

$$L_c \text{ (nm)} \times [\text{Specific surface area of CNT (m}^2\text{/g)}]^{1/2} > 80 \quad \text{[Formula 1]}$$

wherein, $L_c$ is crystal size measured by X-ray diffraction method.

* * * * *